(12) United States Patent
Van Uffel et al.

(10) Patent No.: US 6,219,084 B1
(45) Date of Patent: Apr. 17, 2001

(54) METHOD AND DEVICE FOR CONTROLLING A LASER HAVING A THRESHOLD CURRENT LEVEL

(75) Inventors: Bruno August Van Uffel, St. Katelijne-Waver; Johannes Stoffel Buyze, Edegem, both of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/387,970

(22) Filed: Sep. 1, 1999

Related U.S. Application Data

(60) Provisional application No. 60/113,334, filed on Dec. 22, 1998.

(30) Foreign Application Priority Data

Sep. 23, 1998 (EP) ................................................. 98203266

(51) Int. Cl.[7] ................................................. B41J 2/435
(52) U.S. Cl. ............................ 347/247; 347/237; 347/132
(58) Field of Search ................................. 347/236, 237, 347/246, 247, 253, 130, 132; 372/26

(56) References Cited

U.S. PATENT DOCUMENTS

| | | | |
|---|---|---|---|
| 4,728,989 | 3/1988 | Ohmori | 347/132 |
| 5,410,339 | 4/1995 | Bisaiji et al. | 347/140 |
| 5,742,323 | * 4/1998 | Fukushima | 347/246 |
| 5,764,664 | * 6/1998 | Yip et al. | 372/26 |

FOREIGN PATENT DOCUMENTS

| | | |
|---|---|---|
| 0258060 | 3/1988 | (EP) . |
| 0548591 | 6/1993 | (EP) . |

OTHER PUBLICATIONS

EP 98 20 3266 European Search Report, Feb. 3, 1999, 2 pp.

* cited by examiner

*Primary Examiner*—N. Le
*Assistant Examiner*—Hai C. Pham
(74) *Attorney, Agent, or Firm*—Baker Botts L.L.P.

(57) ABSTRACT

A method for controlling a radiation intensity of a laser beam emitted by a laser having a threshold current level above which the laser emits the laser beam, the method including the steps of: supplying an electrical driving current for driving the laser, the electrical driving current increasing up to about the threshold current level; subsequently immediately further increasing the electrical driving current to a value above the threshold current level for causing the laser to emit the laser beam; and an image exposure device implementing this method.

18 Claims, 6 Drawing Sheets

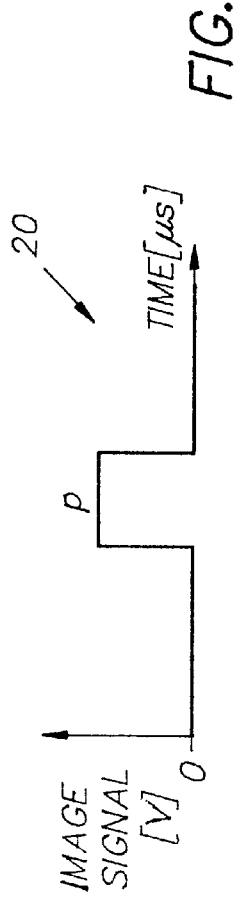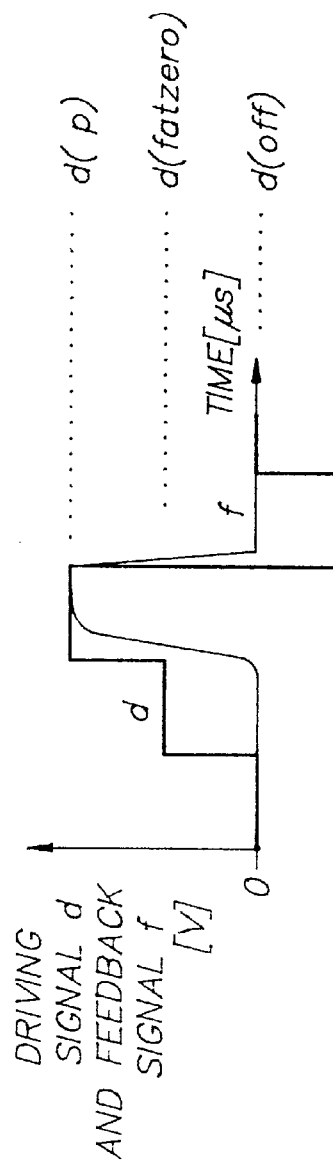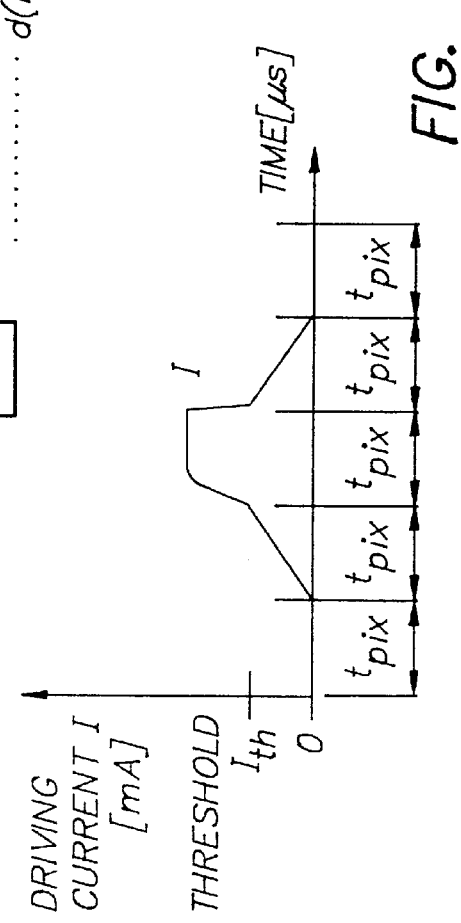

METHOD AND DEVICE FOR CONTROLLING A LASER HAVING A THRESHOLD CURRENT LEVEL

This application claims the benefit of U.S. Provisional No. 60/113,334 filed Dec. 22, 1998.

FIELD OF THE INVENTION

The present invention relates to an image exposure device using a laser; more specifically the present invention is related to controlling the driving current applied to the laser.

BACKGROUND OF THE INVENTION

In a conventional image exposure device, as used e.g. in an electrophotographic printer or in an imagesetter, an image is formed on a radiation-sensitive body by exposing the body image-wise by a laser beam from a laser. In a conventional electrophotographic printer, the image on the radiation-sensitive body is a latent image, which is developed into a visible toner image, that is subsequently transferred to an image carrier such as a sheet of paper. In a conventional imagesetter, the radiation-sensitive body usually is the image carrier itself, such as a roll of photographic film; on the film, a latent image is exposed, that is afterwards developed in a processor into a visible image.

The laser in the image exposure device may be a semiconductor laser; the laser beam is modulated based on an image signal that corresponds to the image.

A semiconductor laser has a threshold current level $I_{th}$ (expressed e.g. in mA). A laser beam is emitted if the electrical driving current I applied to the laser is larger than the threshold current level $I_{th}$. FIG. 1a shows two curves, one for a low temperature and one for a high temperature, with corresponding threshold current levels $I_{thLOW}$ and $I_{thHIGH}$; the temperature dependence of $I_{th}$ is discussed below. Below the threshold current level $I_{th}$, the radiation intensity RI (expressed e.g. in mW) of the radiation emitted by the laser is very small, and in fact, the emitted radiation is not coherent, i.e. it is not really laser radiation. Thus, in general only the portions of the curves for I larger than $I_{th}$ are useful for imaging purposes; therefore the portions of the curves in FIG. 1a for I smaller than $I_{th}$ are drawn as dashed lines. The driving current I that is applied to the laser is modulated based on the image signal, so that the intensity RI of the emitted laser beam is a function of the image signal.

The laser threshold current level $I_{th}$ is not constant, but depends on different factors, such as the ambient temperature, the ageing of the laser, differences between individual lasers. Fluctuations in the threshold current level cause significant variations of the laser beam intensity; as shown in FIG. 1a, the threshold current level changes from $I_{thLOW}$ to $I_{thHIGH}$ when temperature changes from low to high.

In order to obtain good image quality, the intensity RI of the laser beam should depend only on the image signal and should not change with the factors influencing the threshold current level $I_{th}$. Therefore, it is customary to control the laser, usually by means of a feedback circuit as known in system control theory. Customarily the required intensity of the laser beam is determined and a signal based on the measured intensity is fed back to the driving circuit of the laser in order to control the laser driving current. In this way, the effect of disturbances, influencing e.g. the laser threshold current level, can be reduced.

Two known methods to control the laser are illustrated by means of FIG. 1a. Suppose that, at low temperature, an image or a portion of an image must be written at the laser beam intensity corresponding to point B in FIG. 1a. In a first method the laser is driven from point O to point B in one step; in a second method the laser is driven from O to B via A in three steps. Both methods are now discussed in detail.

In the first method, at the moment the image must be written, the laser starts from zero driving current and zero radiation intensity in point O, and the laser driving current is increased until the driving current corresponding to point B is reached. A disadvantage of this first method is that it takes a long time for the driving current to reach point B, since the operating point of the laser must pass the whole way from O via A to B (see FIG. 1a). Because of the long time that is required, the imaging speed is limited.

In the second method, the laser is driven from O to B via A in three steps. In the first step, the laser is driven from O to A. Then, in the second step, the laser is kept at point A, until an image, or more precisely, until a non-zero portion of an image has to be written. Finally, in the third step, when a non-zero portion of the image must be written, the laser is driven from A to B. Essential in this method is that, beforehand, the driving current is set to an initial driving current that equals the threshold current level $I_{th}$Low before the image is written. The advantage is that, when an image is to be written, the laser reacts promptly to the change in laser driving current corresponding to a change from point A to point B, thus overcoming the problem of the limited imaging speed of the first method. A disadvantage of this second method is that the laser is kept for some time at operating point A, which means that some radiation is being emitted before the actual image is written. This means that the radiation-sensitive body is exposed by the radiation emitted in A. Therefore, specific countermeasures may have to be taken; in order to avoid that an image is formed by the radiation emitted in A, in an electrophotographic printer for example the electrophotographic parameters such as the cleaning potential may be adjusted (the cleaning potential is discussed e.g. in EP-A-0 788 273). However, these countermeasures have drawbacks (adjusting the cleaning potential, for example, may result in increased carrier loss).

Variants of the second method exist: instead of setting the driving current to an initial value that equals the threshold current, the driving current may be set to a value about the threshold current value, or, alternatively, the driving current may be set to a value below the threshold current value.

Thus, the problems of the first and the second method discussed above are either the limited imaging speed, or undesired emitted radiation, or both.

Patent U.S. Pat. No. 5,416,504 discloses an image exposure device that implements another variant of the second method discussed above (the second method involves driving the laser to B in FIG. 1a in three steps: driving the laser from O to A; keeping the laser in A; driving the laser from A to B). In this device, the initial driving current is set about the threshold current level of the semiconductor laser (i.e. the laser is driven from O to about point A in FIG. 1a) in two substeps: first the driving current is set to a first value near the threshold current level, using the output of a counter circuit, and then the driving current is adjusted to a second value about the threshold current level by incrementing or decrementing this counter. The counter is incremented or decremented depending on the difference between a reference voltage and a monitor voltage that indicates the actual laser beam intensity and that is obtained as follows: the light from the laser is input to a monitor diode; the monitor diode outputs a current that is converted to the monitor voltage.

When the monitor voltage equals the reference voltage, this indicates that the laser beam has reached a predetermined intensity. Finally, in order to write an image, the input image signal is added to the counter output value (the counter output value corresponding to the above second value of the driving current) and the sum is converted into an electrical current for driving the laser. The counter output can only change gradually; the purpose hereof is to stabilise the control of the driving current. The laser beam is monitored only during the time that no image signal is applied to the laser; there is no feedback during exposure of the image. A disadvantage of this device is, as mentioned above, that undesired radiation is emitted which exposes the radiation-sensitive body. Another disadvantage is the high complexity of the circuitry that controls the laser driving current. Yet another disadvantage is that there is no feedback, and hence disturbances—influencing e.g. the laser threshold current level—are not coped with during image exposure.

OBJECTS AND SUMMARY OF THE INVENTION

It is an object of the present invention to provide a method for controlling the radiation intensity of a laser beam, that solves the above mentioned problems, by promptly driving the laser to a desired radiation strength and at the same time significantly reducing the emission of undesired radiation.

Another object is to provide a method for controlling the radiation intensity of a laser beam, that can be implemented in a simple and cost-effective way.

Another object is to provide a method for generating a high quality image.

These objects are realised by a method comprising the steps defined in claim 1. These objects are also realised by a method comprising the steps defined in claim 3. These objects are also realised by an image exposure device, having the specific features defined in claim 5. These objects are also realised by an image exposure device, having the specific features defined in claim 11.

Specific features for preferred embodiments of the invention are set out in the dependent claims.

It is another object of the present invention to provide an electrophotographic printer that creates a high quality image on a photoconductive member, such as a drum or a belt, in a fast and cost-effective way. This object is realised by an electrophotographic printer, having the specific features defined in claim 9. This object is also realised by an electrophotographic printer, having the specific features defined in claim 15.

It is still another object of the present invention to provide an imagesetter that creates a high quality image on a radiation-sensitive sheet in a fast and cost-effective way. This object is realised by an imagesetter, having the specific features defined in claim 10. This object is also realised by an imagesetter, having the specific features defined in claim 16.

Some terms used in the claims are defined below.

An electrical driving current I "about" the threshold current level $I_{th}$ fulfils the following relation, wherein RI is the radiation intensity emitted at the driving current I, and $RI_{max}$ is the maximum value of the radiation intensity RI for the laser that is preferably not exceeded so as not to reduce the laser life:

$I>0.3*I_{th}$ and $RI<0.3*RI_{max}$, preferably $I>0.5*I_{th}$ and $RI<0.2*RI_{max}$, more preferably $I>0.7*I_{th}$ and $RI<0.15*RI_{max}$, most preferably $I>0.8*I_{th}$ and $RI<0.1*RI_{max}$.

A "substantially zero" electrical driving current is a current for driving a laser that is preferably smaller than 25% of the threshold current level $I_{th}$ of the laser, more preferably smaller than 10% of $I_{th}$, most preferably less than 5% of $I_{th}$.

A "pixel" is a constituting element of a digital image; a digital image is typically represented by a rectangular matrix of pixels, each having an electronic pixel value. The location of each pixel within the matrix corresponds to a specific location on the image carrier. These locations may be equidistant or not. Each electronic pixel value corresponds to an optical density of the image at the specific location; the electronic pixel values together form the image signal that is used for driving the laser.

A "binary pixel" can have two electronic pixel values, customarily represented by 0 and 1; these two values represent a high density and a low density, which may be obtained e.g. by applying toner or no toner, or generating locally dye or no dye, or by keeping or removing silver in a photographic process. In the production of printing plates, 0 may result in an ink repellent zone, whereas 1 may result in an ink accepting zone.

A "continuous tone system" is a system wherein multiple density levels may be generated on the image carrier, with no perceptible quantisation to them. In order to achieve such fine quantisation, usually 256 different density levels are required, such that each "continuous tone pixel" may have a value from 0 to 255.

A "multilevel system" has a reduced number of density levels. In electrophotography e.g., usually a reduced number of density levels can be generated consistently, e.g. 16 levels; such a system is called a "multilevel system" and the pixels are called "multilevel pixels".

A "radiation-sensitive means" comprises a material that is sensitive to electromagnetic radiation. The radiation-sensitive means may be a photoconductive member, such as a photoconductive drum or belt, as used in an electrophotographic apparatus. It may also be a radiation-sensitive sheet, such as a photographic or a thermographic sheet. The electromagnetic radiation may be visible light, but it may also be invisible radiation, such as ultraviolet or infrared radiation.

A "radiation-sensitive sheet" may be a cut sheet or a sheet on roll that has a length of e.g. 100 m. The sheet may be made of film, such as poly(ethylene terephtalate) film, it may be made of paper, of (aluminium) plate, or of another radiation-sensitive material as known in the art.

In a method in accordance with the present invention, the laser is driven (see FIG. 1a) directly from O to B via A in two steps: first the laser is driven from O to A, and then, in a second step immediately after the first step, the laser is driven from A to B. Preferably, the first step is controlled by a first electrical signal and the second step is controlled by a second electrical signal, wherein the second electrical signal is relatively independent from the first electrical signal. The first prior art method discussed above drives the laser from O to B in only one step. An advantage of the two distinct steps in the present invention is that it is possible to take specific measures in the first step so that portion OA of the curve OAB in FIG. 1a requires only little time. This provides the advantage that the laser is promptly driven to the desired radiation strength in B. The second prior art method discussed above drives the laser from O to B in three steps while keeping the laser for some time in or near A, until an image has to be written. In the present invention, the driving current is not set to an initial driving current at or near A before the image is written; this significantly reduces the emission of undesired radiation, as discussed below, and is another advantage of the present invention.

In the second prior art method, the laser is kept for some time at point A (see FIG. 1a), thus emitting undesired radiation; a measure for the time during which undesired radiation is emitted is the time $t_{keep}$, defined as follows. Suppose that the image is exposed scan-wise, i.e. as a succession of scan lines (a scan line is shown in FIG. 2 as the line along arrow B on the surface of drum 15; FIG. 2 is discussed hereinafter). For each scan line that contains at least two non-zero image portions, the time $t_{between}$ of the scan line is defined as the maximum time between two successive non-zero image portions in the scan line. The time $t_{max}$ of an image is defined as the maximum value of the $t_{between}$-values of the scan lines of the image (only the scan lines with at least two non-zero image portions). Finally, $t_{keep}$ is the mean value of the $t_{max}$-values of a set of representative images that are to be exposed by the laser. Thus, $t_{keep}$ as defined above is the maximum time that is typically to be expected between two non-zero image portions; during this time, the laser is kept at point A in the second prior art method and undesired radiation is emitted.

Preferably, in an embodiment in accordance with the present invention, the laser driving current is increased to about the threshold current level in a time $t_{inc}$ that is substantially smaller than $t_{keep}$; substantially smaller means that $t_{inc}$ is smaller than 50% of $t_{keep}$, preferably smaller than 30% of $t_{keep}$, more preferably smaller than 20% of $t_{keep}$, most preferably smaller than 10% of $t_{keep}$.

The reduction of emitted undesired radiation is illustrated by FIG. 1b and FIG. 1c. In a preferred embodiment of the present invention, discussed hereinafter, the laser driving current I increases in a time $t_{inc}$ in a substantially linear way from zero to the threshold current level $I_{th}$. Suppose that the relation between driving current I and time is linear, and that the relation between radiation intensity RI and driving current I is also linear (i.e. portion OA of the curve in FIG. 1a is part of a straight line). Then, the relation between radiation intensity RI and time is also linear, as shown in FIG. 1b, and the quantity of emitted undesired radiation, i.e. the (radiant) exposure, is the integral under the curve in FIG. 1b, which equals the area 31 of the hatched triangle:

$$0.5 * t_{inc} * \text{Intensity}_A$$

In the second prior art method, the laser is kept at point A, and $t_{keep}$ as defined above is a measure for the time during which undesired radiation is emitted. During the time $t_{keep}$, a quantity of undesired radiation is emitted at A that equals the area 32 of the hatched rectangle in FIG. 1c:

$$t_{keep} * \text{Intensity}_A$$

The area 31 is significantly smaller than the area 32, since the area of a triangle is only half of the area of a rectangle that has the same base, and since moreover, as discussed above, $t_{inc}$ is preferably substantially smaller than $t_{keep}$. To get the complete quantity of emitted undesired radiation for the second prior art method, the radiation emitted when passing OA (=the area of a triangle) must still be added to the quantity calculated above (=the area 32 of the rectangle). Also if, in an embodiment in accordance with the present invention, the laser driving current increases in another than a linear way from zero to the threshold current level $I_{th}$, e.g. in a parabolic way, the quantity of undesired emitted radiation is significantly smaller than in the second prior art method: the surface 31 of the triangle in FIG. 1b then has to be replaced by the surface below e.g. a parabola.

The method of the present invention may be implemented in an image exposure device. Preferred embodiments of the method may be implemented in preferred embodiments of the image exposure device, and preferred embodiments of the image exposure device may result in preferred embodiments of the method of the present invention. Some preferred embodiments of method and device are discussed below.

In a preferred embodiment in accordance with the present invention, increasing the driving current up to about the threshold current level is achieved by a driving signal "$d_{fatzero}$" immediately before the image has to be written. The magnitude and the time duration of "$d_{fatzero}$", are determined so that the driving current increases up to about the threshold current level.

In another embodiment in accordance with the present invention, the driving current is quickly decreased after an image is written. This may be achieved by applying a signal "$d_{backbias}$" as discussed hereinafter.

An advantage of a preferred embodiment in accordance with the present invention is that a high quality image can be generated. This may be achieved by keeping the laser driving current well under control, preferably before the image is written (e.g. by means of a signal "$d_{fatzero}$", as explained hereinafter), as well as after the image is written (e.g. by means of a signal "$d_{backbias}$", as explained hereinafter), and by reducing the emitted undesired radiation.

In an embodiment in accordance with the present invention, the exposed image comprises binary pixels. In another embodiment, the image comprises multilevel pixels. In yet another embodiment, the image comprises continuous tone pixels.

In a preferred embodiment in accordance with the invention, the feedback circuit is active during exposure. This provides the advantage that the radiation intensity of the laser beam may be adjusted during a scan line (FIG. 2, discussed hereinafter, shows a scan line as the line along arrow B on the surface of drum 15).

Further advantages and embodiments of the method and of the device in accordance with the present invention will become apparent from the following detailed description and from the drawings.

BRIEF DESCRIPTION OF THE DRAWINGS

The invention is described hereinafter by way of example with reference to the accompanying figures, wherein:

FIG. 4a shows a first image signal;

FIG. 4b shows a driving signal and a feedback signal for this first image signal for an embodiment in accordance with the present invention;

FIG. 4c shows a driving current for this first image signal for the same embodiment in accordance with the present invention;

FIG. 6a and FIG. 6b illustrate how values $d_{fatzero}$ and $d_{backbias}$ are determined for a preferred embodiment in accordance with the present invention.

DETAILED DESCRIPTION OF THE INVENTION

Figure 2:
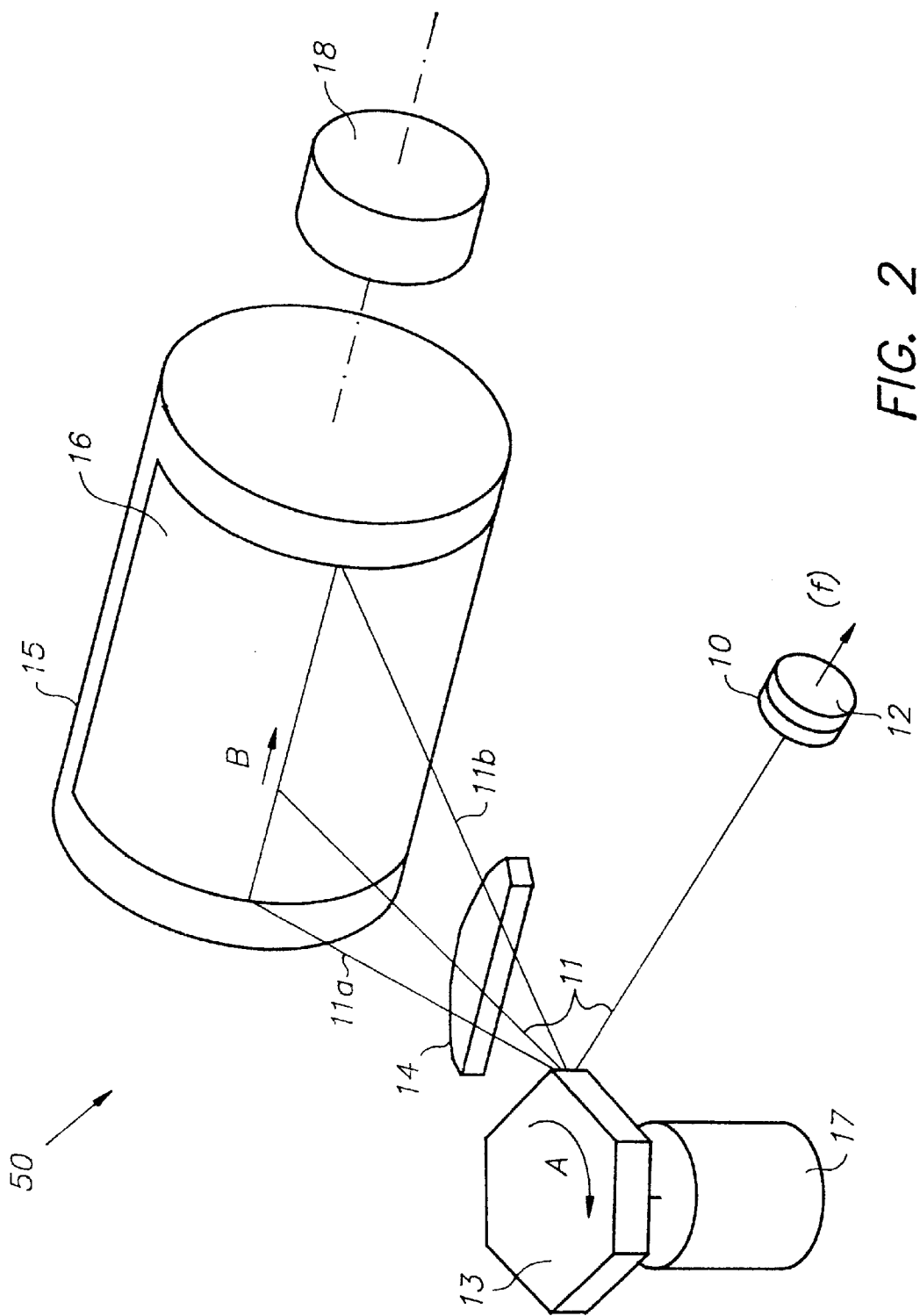
FIG. 2 is a schematic illustration of an image exposure device.

An embodiment of an image exposure device 50 is shown in FIG. 2. A laser beam 11 is emitted by a semiconductor laser 10 and is focused and caused to move by an optical system to scan the surface of a photoconductive drum 15. The optical system, as known in the art, includes a collimator lens, not shown, a polygonal mirror 13 driven by motor 17 and rotating in the direction A and an f-θ lens 14. The laser beam 11 scans the surface of photoconductive drum 15 between the extreme beam positions 11a and 11b and thus exposes a scan line along arrow B on the surface of drum 15. Drum 15 is rotated by motor 18 so that successive scan lines form a latent image 16 on the surface of the drum 15. Monitor diode 12, at the back of semiconductor laser 10, provides a signal f that is proportional to the radiation intensity RI of the radiation emitted by laser 10.

Figure 1A:
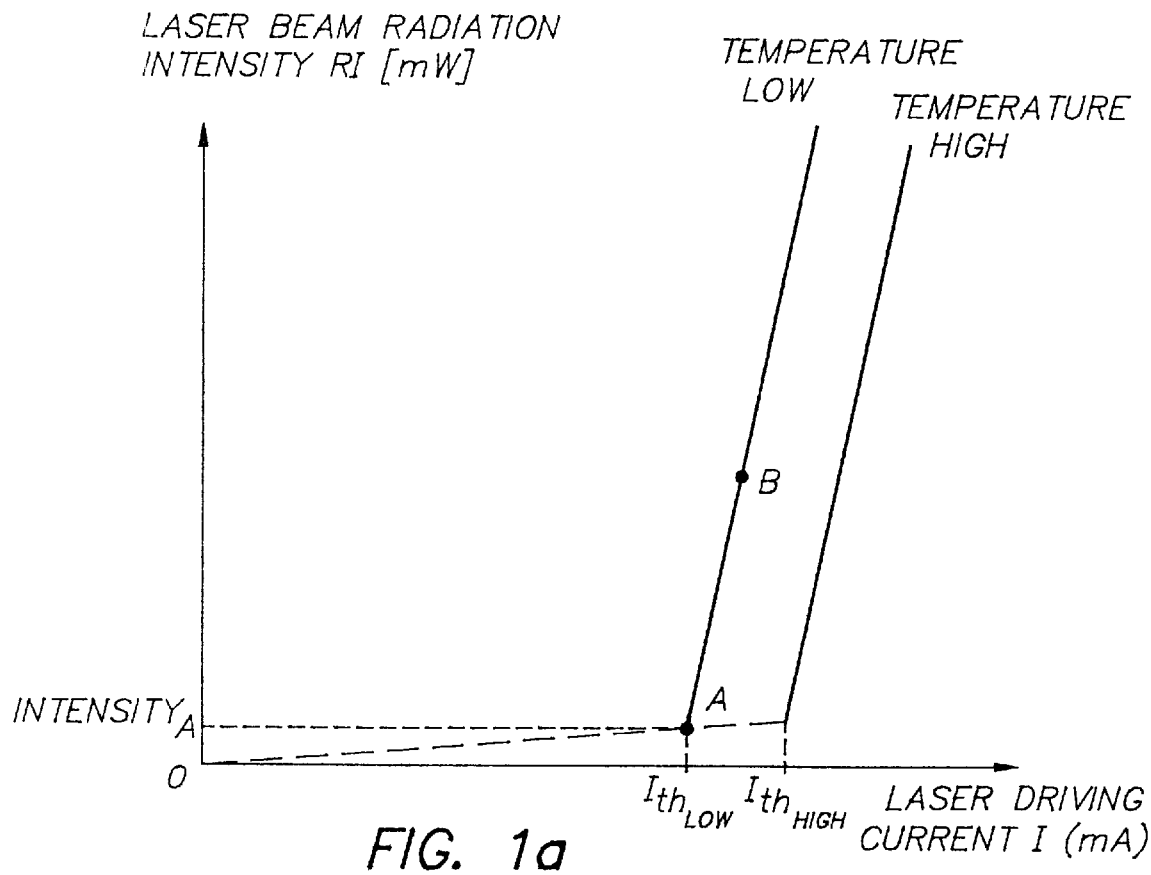
FIG. 1a is a diagram showing the radiation intensity of the laser beam RI as a function of the laser driving current I, and the influence of temperature thereon.
Figure 3:
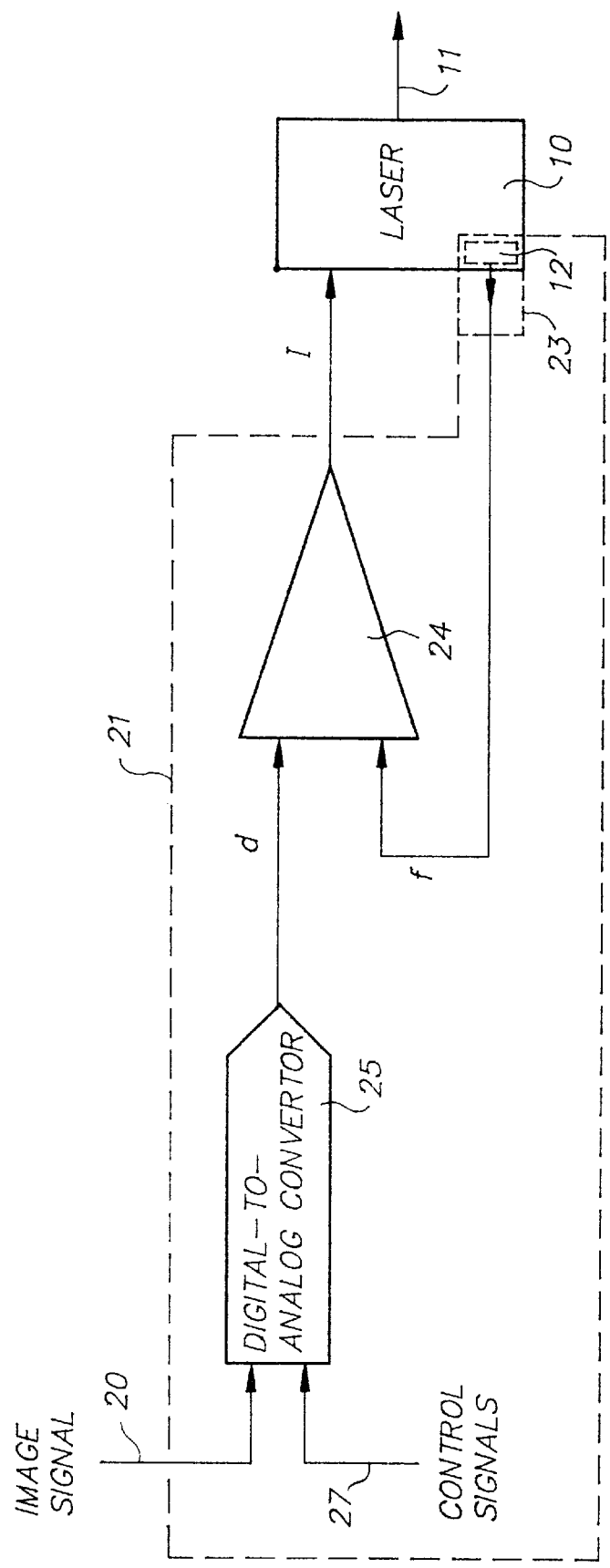
FIG. 3 is a block diagram showing an embodiment of a laser driving circuit in accordance with the present invention.

An embodiment of a driving circuit for laser 10, in accordance with the present invention, is shown schematically in FIG. 3. The embodiment comprises driving means 21, that preferably include feedback means 23 and comparing means 24. The signal f (see FIG. 2 and 3) from monitor diode 12 is fed back by feedback means 23 to comparing means 24 where it is compared to a driving signal d. Driving means 21 outputs an electrical driving current I to laser 10 that depends on the difference d−f: preferably, the rate of change of driving current I is proportional to d−f. When d−f<0, the driving current I will decrease; when d−f>0, I will increase. Starting from a situation wherein I=0, which means that the laser does not emit radiation and that thus f=0, and wherein a driving signal d>0 is applied, driving current I will increase since d−f>0. This also causes f to increase, since f is proportional to the radiation intensity of laser beam 11 and since the radiation intensity RI increases with increasing driving current I (see FIG. 1a); as f increases, the driving current I increases more slowly, until finally I remains constant when d−f=0.

As shown in FIG. 3 and discussed below, the driving signal d is based on the image signal 20 and on a plurality of control signals 27. Preferably, the image signal 20 and the control signals 27 are digital signals that are converted to an analog driving signal d via a digital-to-analog converter 25. However, the image signal 20 and/or the control signals 27 may also be analog signals.

FIG. 4a to 4c illustrate an embodiment in accordance with the present invention wherein the laser driving current I is increased to about the threshold current level $I_{th}$ by applying a signal "$d_{fatzero}$" during a time $t_{inc}$ that equals the pixel period $t_{pix}$, i.e. the time it takes to write a pixel. FIG. 4b shows a driving signal d. The driving signal d causes laser 10, as shown in FIG. 3, to be supplied with a driving current I, for writing a pixel having an electronic pixel value p. FIG. 4b and 4c show the values of d, f and I, that correspond to the specific image signal 20 shown in FIG. 4a, as a function of time during a time of five pixel periods $t_{pix}$. The image signal 20 is zero during the first two pixel periods, equals p during the third pixel period, and is again zero during the fourth and the fifth pixel periods. The image signal 20 is combined with control signals 27, as shown in FIG. 3, to form the driving signal d. FIG. 4b and 4c show that d equals $d_{off}$ during the first pixel period; the driving current I is zero, the laser does not emit radiation and feedback signal f is zero. The value $d_{off}$ may be zero. How the value $d_{off}$ is determined, and how the other values $d_p$, $d_{fatzero}$ and $d_{backbias}$ are determined, is discussed below. In the second pixel period, d equals $d_{fatzero}$. This causes the driving current I and the feedback signal f to increase since f is smaller than d. The value $d_{fatzero}$ is determined so that at the end of the pixel period the feedback signal f has hardly increased and the driving current I approximately equals the threshold current level $I_{th}$. The third pixel is the actual image pixel. The driving signal d now equals $d_p$. Since I approximately equals $I_{th}$ at the start of the image pixel, the driving current I quickly increases to the driving current value that corresponds to the desired laser beam intensity. The laser emits a laser beam and feedback signal f increases until f equals $d_p$; from that moment on, the driving current I and the laser beam intensity remain constant. In a preferred embodiment, during the fourth pixel period, d equals $d_{backbias}$, with approximately $d_{off}-d_{backbias}=d_{fatzero}-d_{off}$. In this way, even when f has become nearly zero because the driving current I has become smaller than the threshold current level $I_{th}$, the driving current I decreases quickly; the driving current I preferably decreases about as fast as it increased in the second pixel period, i.e. the pixel period of $d_{fatzero}$. The idea behind signal $d_{backbias}$ is the same as the idea behind $d_{fatzero}$: passing quickly through the region of undesired emitted radiation, i.e. portion OA of the curve in FIG. 1a. If no signal $d_{backbias}$ would be applied, and if d would equal $d_{off}$ instead, the driving current would decrease slowly to zero and all the time the laser would continue to emit radiation until f=0. This would cause the problem of undesired emitted radiation and the additional problem that, because of the slowly decreasing driving current, the driving current for a next image pixel would have to start from some unknown current value between zero and the threshold current level $I_{th}$. Both problems are solved by quickly decreasing the driving current during the fourth pixel period, preferably to substantially zero, and preferably in a time not larger than twice the time $t_{inc}$ it took to increase the driving current up to about the threshold current level $I_{th}$, more preferably in a time not larger than $t_{inc}$. In the fifth pixel period, finally, d again equals $d_{off}$; the image signal 20, the driving current I and the feedback signal f all equal zero.

As explained above, FIG. 4b shows the driving signal d for writing a single image pixel having an electronic pixel value p. If, instead of writing a single image pixel, several image pixels have to be written one after the other, having electronic pixel values p1, p2, etc. differing from zero, then preferably a signal $d_{fatzero}$ is applied before the first image pixel and preferably a signal $d_{backbias}$ is applied after the last image pixel. If two subsequent image pixels, having electronic pixel values differing from zero, are separated from each other by two or more pixels with p=0, then preferably the procedure of FIGS. 4a to 4c is simply repeated for the subsequent image pixels. The only remaining case is the one wherein two image pixels having electronic pixel values p1 and p2, differing from zero, are separated by a single pixel with p=0.

Figure 5A:
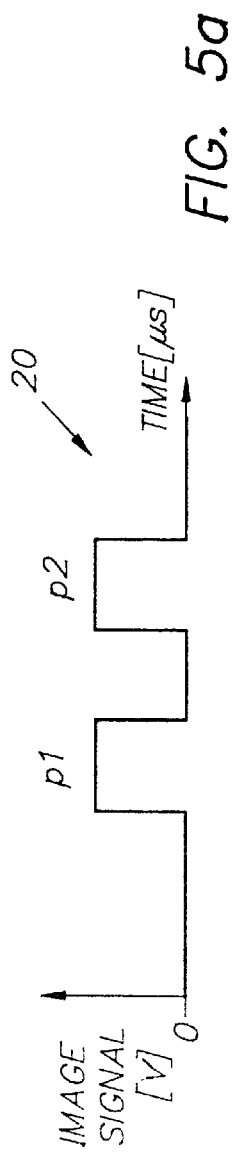
FIG. 5a shows a second image signal.
Figure 5B:
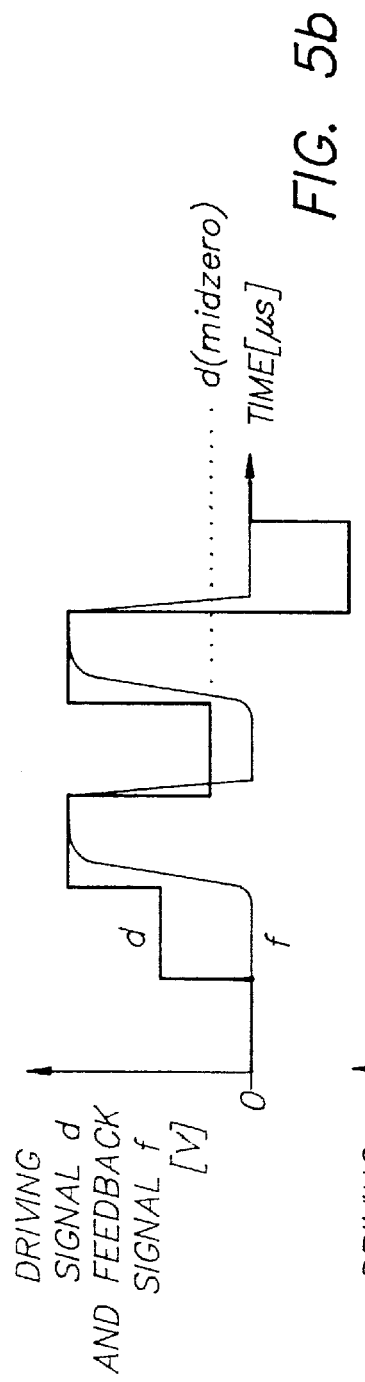
FIG. 5b shows a driving signal and a feedback signal for this second image signal for the same embodiment in accordance with the present invention.
Figure 5C:
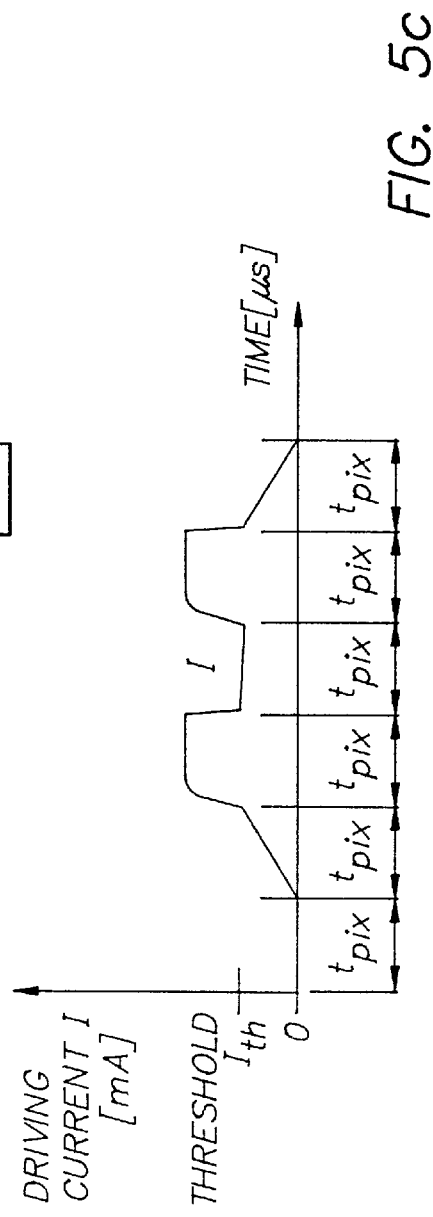
FIG. 5c shows a driving current for this second image signal for the same embodiment in accordance with the present invention.

FIGS. 5a to 5c show this remaining case. Between the two image pixels, the driving signal d equals a value $d_{midzero}$— determined below that may differ from $d_{off}$, since the driving current I is preferably not decreased to zero but kept at a "standby" value about the threshold current level $I_{th}$, so that the driving current I can promptly increase again to write the second image pixel p2. The electronic pixel values p1 and p2, shown in FIG. 5a, may differ from each other. FIGS. 5a to 5c show the image signal 20 and signals d, f and I as in FIGS. 4a to 4c. During the six shown pixel periods $t_{pix}$, the driving signal d subsequently gets the values $d_{off}$, $d_{fatzero}$, $d_{p1}$, $d_{midzero}$, $d_{p2}$, $d_{backbias}$; except for $d_{midzero}$, these values are not indicated in FIG. 5b.

The values of $d_{off}$, $d_{fatzero}$, $d_{backbias}$, $d_{midzero}$ and $d_p$ may be determined as follows. Preferably, these values are determined before or after an image is exposed, i.e. not during image exposure. Preferably, determination of these values is repeated at regular time intervals. The length of these time intervals may differ for each value, e.g. $d_{fatzero}$ may be determined more often than $d_{off}$. The length of the time intervals depends on the effect that each value has on the laser control system and on the relation of each value with disturbances, such as the ambient temperature and the ageing of the laser; e.g. $d_{fatzero}$ is directly related to $I_{th}$ which is very much temperature-dependent; therefore $d_{fatzero}$ is preferably determined frequently, e.g. every time after a single image is written.

To determine $d_{off}$, several decreasing values of the (digital) driving signal d may be applied, e.g. d=10, 9, 8, etc. until the lowest value of d is found that still causes a measurable feedback signal f larger than zero; this lowest value of d is called do. Now $d_{off}=d_0-\text{off\_offset}$, wherein off\_offset>0 and off\_offset<$d_0$.

Figure 6A:
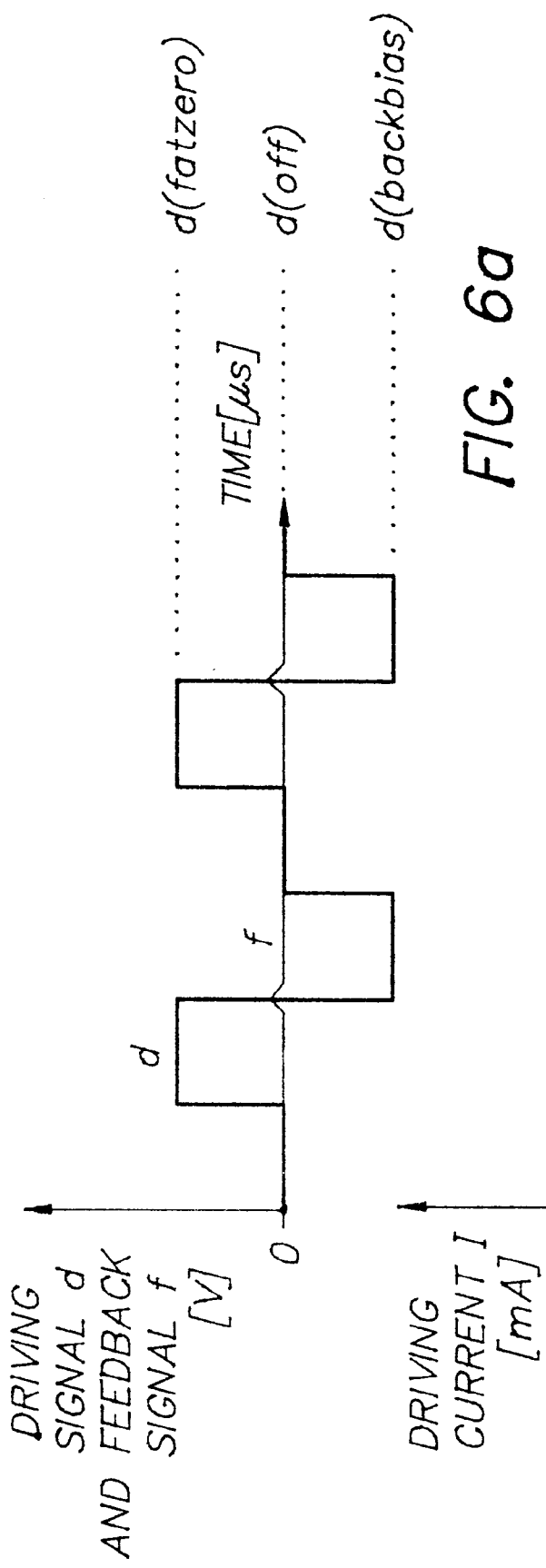
FIG. 6a shows a driving signal and a feedback signal for this driving current I; together
Figure 6B:
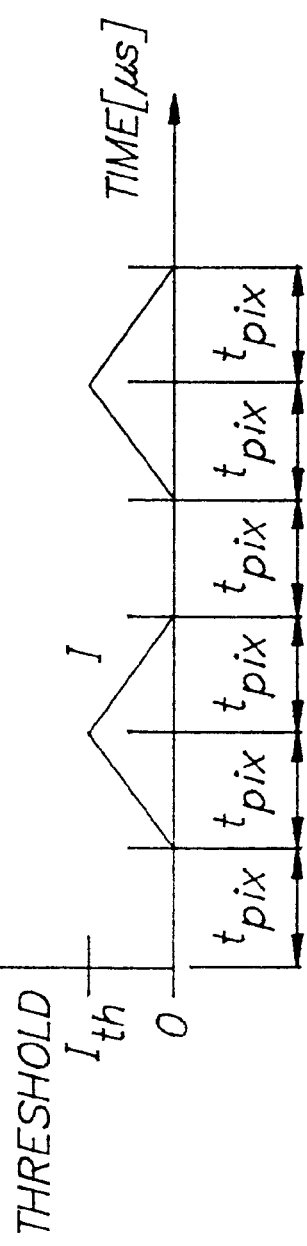
FIG. 6b shows a driving current I.

Values $d_{fatzero}$ and $d_{backbias}$ may be determined as illustrated in FIGS. 6a and 6b. FIG. 6a shows the driving signal d and the feedback signal f while FIG. 6b shows the driving current I as a function of time, represented in the same way as in FIGS. 4a to 4c and FIGS. 5a to 5c. A driving signal d as shown in FIG. 6a is applied, wherein $d_{fatzero}$ successively gets increasing values, e.g. $d_{off}$, $d_{off}+1$, $d_{off}+2$, etc. until feedback signal f>$f_{th}$, wherein $f_{th}$ is a very small positive value. The value of $f_{th}$ may be determined so that the corresponding driving current I equals $I_{th}$. It is however not required that I equals $I_{th}$; as explained above, it is sufficient that I is about $I_{th}$. Since the feedback signal f is very small when I is about $I_{th}$, the choice of value $f_{th}$ is not critical. In FIG. 6a, $d_{backbias}$ may be determined from the equation:

$$d_{off}-d_{backbias}=d_{fatzero}-d_{off}+\text{backbias\_offset}$$

wherein backbias\_offset is a value that may be determined so that the driving current I completely decreases to zero from its maximum value about the threshold current level $I_{th}$, as shown in FIG. 6b.

The value of $d_{midzero}$ may equal $d_{off}$. Alternatively, $d_{midzero}$ may be chosen so that it certainly makes the driving current decrease and that the driving current decreases as slowly as possible; in this way, it is known what is the value of the driving current in the "midzero" pixel. Yet alternatively, $d_{midzero}$ may be chosen so that feedback signal f has a predetermined value at the end of the "midzero" pixel, i.e. at the end of the fourth pixel period in FIGS. 5a to 5c.

The value of $d_p$ may be determined in two steps: first a value $d_{pmax}$ is determined, and then $d_p$ is determined by scaling with respect to $d_p$max. In the first step, the value $d_p$max may correspond to the maximum driving current $I_{max}$ and the maximum radiation intensity $RI_{max}$ of the laser; $I_{max}$ and $RI_{max}$ are e.g. values that are preferably not exceeded so as not to reduce the laser life. For example, for a TOLD9321 semiconductor laser from Toshiba, $I_{max}=I_{th}+15$ mA and $RI_{max}=5$ mW; and $d_{pmax}$ may be determined by successively applying increasing driving signals d, measuring I, and determining the value $d_{max}$ of d for which $I=I_{max}=I_{th}+15$ mA. In the second step, $d_p$ is then determined by the formula:

$$d_p=p/p_{max}*(d_{pmax}-d_{off})+d_{off}$$

wherein p (with 0<p<$p_{max}$) and $p_{max}$ are the electronic pixel values to which the driving signals $d_p$ and $d_{pmax}$ correspond.

From the preceding description and drawings, it is clear that a method in accordance with the present invention can be implemented in a simple way that is also cost-effective.

Instead of determining the values of $d_{off}$, $d_{fatzero}$, $d_{backbias}$, $d_{midzero}$ and $d_p$ in the way as explained above, they may also be determined in another way. For example, $d_{fatzero}$ may be determined by first determining the threshold current level $I_{th}$, and by subsequently increasing the driving signal d step by step while measuring I; the value of d where I approximately equals $I_{th}$ is $d_{fatzero}$. First determining $I_{th}$ may be done by increasing the driving signal d step by step, and measuring the feedback signal f and the driving current I; $I_{th}$ is the driving current where the relation between I and f changes abruptly (see also FIG. 1a).

In the embodiment discussed above and illustrated in FIGS. 4a to 4c, the laser driving current I is increased to about the threshold current level $I_{th}$ by applying a signal "$d_{fatzero}$" during a time $t_{inc}$ equal to the pixel period $t_{pix}$. In another embodiment in accordance with the present invention, $t_{inc}$ may be smaller than $t_{pix}$, or, alternatively, $t_{inc}$ may be larger than $t_{pix}$. As explained hereinbefore, in an embodiment in accordance with the present invention, preferably $t_{inc}$ is substantially smaller than the maximum time $t_{keep}$ that is typically to be expected between two non-zero image portions; however, $t_{inc}$ may be larger than $t_{pix}$, equal to $t_{pix}$ or smaller than $t_{pix}$.

In a second embodiment in accordance with the present invention, the laser driving current is increased to about the threshold current level by applying a signal "$d_{fatzero}$" during a time $t_{inc}$ longer than $t_{pix}$, e.g. equal to $2*t_{pix}$. To determine $d_{fatzero}$, the method explained above and illustrated in FIGS. 6a to 6b may be used, but now signal $d_{fatzero}$ is applied for a longer time, e.g. for two pixel periods $t_{pix}$. The signal $d_{fatzero}$ need not be constant but may have two or more values, that preferably increase during the successive pixel periods.

Figure 1B:
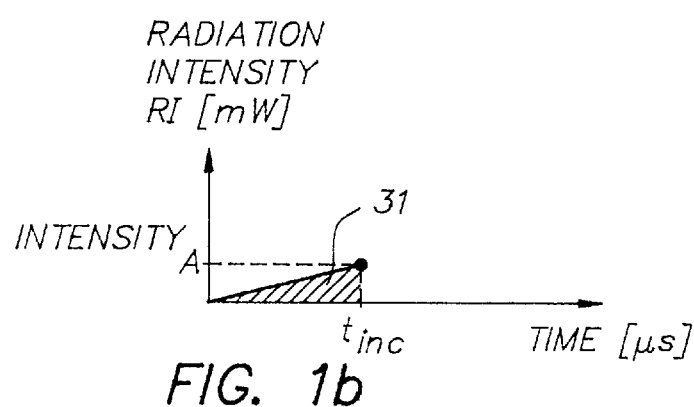
FIG. 1b illustrates the exposure of undesired radiation for an embodiment in accordance with the present invention.
Figure 1C:
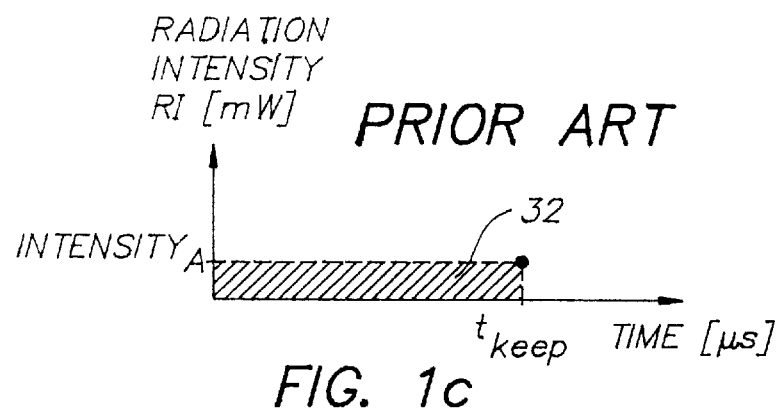
FIG. 1c illustrates the same for a prior art embodiment.

In another embodiment in accordance with the present invention, no signals $d_{fatzero}$, $d_{backbias}$, etc. are applied, but the gain of the control loop—as known in the art of system control theory—is adjusted. The laser is driven in FIG. 1a from O to B in two steps: in the first step, in portion OA of the curve of FIG. 1a, a high gain is used, and in the second step, in portion AB of the curve, a lower gain is used (to discriminate between the two steps, first the threshold current $I_{th}$ is determined, which may be done by applying successively increasing driving signals as explained above). Because of the high gain in portion OA of the curve, the portion OA is passed through quickly, which, together with the immediate further increase of the driving current in the second step, again provides the advantages of significantly reducing the emission of undesired radiation and of promptly driving the laser to the desired radiation strength. The gain is lower in the second step, because a high gain would make the feedback circuit unstable, since the laser beam intensity strongly increases with increasing driving current above the threshold current level (see also the strongly increasing curve AB in FIG. 1b).

The present invention is not limited to the embodiments discussed above, but includes other embodiments, such as the ones outlined below.

The feedback signal is not necessarily proportional to the radiation intensity of laser beam 11; the relationship may e.g. be parabolic instead of linear. Also, for a radiation intensity of zero, the feedback signal is not necessarily zero but may have an offset value differing from zero. Furthermore, instead of the radiation intensity, another quantity, such as the driving current, may be fed back to the laser control system. Alternatively, more than one quantity may be fed back, such as both the radiation intensity and the driving current. In still another embodiment in accordance with the present invention, the feedback means need not be active during exposure but may only be active when no image is being exposed. In this embodiment, the driving signal $d_{fatzero}$ may be converted directly, i.e. without using a feedback signal, into an increasing driving current, and driving signal $d_p$ may directly drive the driving current to a desired level; when no image is being exposed, feedback may be used to determine the values of the control signals 27 such as $d_{fatzero}$; this determination may be carried out as explained above.

As mentioned hereinbefore, the image signal 20 and the control signals 27 are not necessarily digital signals but may be analog signals; thus, the image 16 is not necessarily constituted of (digital) pixels but it may be an analog image as well.

In a method in accordance with the present invention, the electrical driving current in a first step increases up to about the threshold current and then in a second step immediately further increases above the threshold current level, without remaining at or about the threshold current level. The increase up to about the threshold current level may be accomplished, as discussed above, by applying a signal $d_{fatzero}$, but it is clear to those skilled in the art that numerous other ways of increasing the driving current are possible.

A method in accordance with the present invention may be implemented in an image exposure device, as is used e.g. in an electrophotographic printer or in an imagesetter. The electrophotographic printer has a photoconductive member, such as a photoconductive drum or a photoconductive endless belt, that is exposed by the image exposure device. The electrophotographic printer may be a black and white printer, a colour printer, a multi-grey printer. In the imagesetter, a radiation-sensitive sheet may be exposed by visible light, by infrared radiation, by ultraviolet radiation, emitted by the image exposure device.

Application of the present invention is not limited to image exposure. The laser beam, controlled by a method in accordance with the present invention, may also be used for other purposes wherein no image is formed. As an example, the emitted laser beam may be reflected, at least partially, by an optical medium and the reflected beam may be analysed.

A method in accordance with the present invention may be applied to control a semiconductor laser. The laser may emit visible light, but it may also emit other electromagnetic radiation, such as ultraviolet or infrared radiation. The laser is not necessarily a semiconductor laser; a method of the present invention may be applied for any laser or for any source of radiation that exhibits a threshold behaviour. The threshold behaviour must be such that—see also FIG. 1a—the curve showing the radiation intensity as a function of a driving parameter, such as the electrical driving current, exhibits an abrupt change about the threshold value from a low gradient to a high gradient.

Having described in detail preferred embodiments of the current invention, it will now be apparent to those skilled in the art that numerous modifications can be made therein without departing from the scope of the invention as defined in the appending claims.

Parts List 10 laser
11 laser beam
11a,11b laser beam
12 monitor diode
13 mirror
14 lens
15 radiation-sensitive means
16 image
17 motor
18 motor
20 image signal
21 driving means
23 feedback means
24 comparing means
25 converting means
27 control signals
31 area
32 area
50 device

What is claimed is:

1. A method for controlling a radiation intensity of a laser beam emitted by a laser having a threshold current level above which the laser emits said laser beam, the method comprising:

establishing a time period for driving said laser;

supplying an electrical driving current for driving said laser, said electrical driving current increasing up to a predetermined current level substantially immediately before the time period for driving said laser, said predetermined current level being up to about said threshold current level, thereby reducing the emission of undesired radiation; and subsequently immediately further increasing said electrical driving current to a value above said threshold current level for causing said laser to emit said laser beam.

2. The method according to claim 1, wherein said electrical driving current is increasing from a value of substantially zero.

3. A method for controlling a radiation intensity of a laser beam emitted by a laser having a threshold current level above which the laser emits said laser beam, the method comprising:

establishing a time period for driving said laser;

supplying an electrical driving current for driving said laser, said electrical driving current increasing up to a predetermined current level in a time $t_{inc}$ substantially immediately before the time period for driving said laser, said predetermined current level being up to about said threshold current level, thereby reducing the emission of undesired radiation;

subsequently immediately further increasing said electrical driving current to a value above said threshold current level for causing said laser to emit said laser beam and maintaining said electrical driving current for at least a period of time $t_{pix}$; and decreasing said electrical driving current from said value above said threshold current level to substantially zero in a time not larger than twice said time $t_{inc}$.

4. The method according to claim 3, wherein said electrical driving current is increasing from a value of substantially zero.

5. The method according to claim 3, wherein the increasing of the electrical driving current up to the predetermined level is substantially a linear increasing.

6. The method according to claim 3, wherein the increasing of the electrical driving current up the predetermined level is substantially an exponential increasing.

7. An image exposure device comprising:

a radiation-sensitive means;

a laser for emitting a laser beam for exposing said radiation-sensitive means for forming an image thereon wherein said laser has a threshold current level above which the laser emits said laser beam;

driving means for driving said laser with an electrical driving current based on an image signal corresponding to said image; said image signal defining at least one time period for driving said laser;

and wherein said driving means comprises means for increasing said electrical driving current up to a predetermined current level substantially immediately before the time period for driving said laser, said predetermined current level being up to about said threshold current level, thereby reducing the emission of undesired radiation;

and means for subsequently immediately further increasing said electrical driving current to a value above said threshold current level for causing said laser to emit said laser beam.

8. The image exposure device according to claim 7, wherein said electrical driving current is increasing from a value of substantially zero.

9. The image exposure device according to claim 7, wherein said driving means further has:

feedback means for generating a feedback signal based on the radiation intensity of said laser beam;

comparing means for generating said electrical driving current, based on comparing said feedback signal with a driving signal during exposure of said radiation-sensitive means, said driving signal being based on said image signal.

10. The image exposure device according to claim 7, wherein the image formed on said radiation-sensitive means comprises pixels selected from the group consisting of binary pixels, multilevel pixels and continuous tone pixels.

11. An electrophotographic printer comprising the image exposure device according to claim 7, wherein said radiation-sensitive means is a photoconductive member.

12. An imagesetter comprising the image exposure device according to claim 7, wherein said radiation-sensitive means is a radiation-sensitive sheet.

13. An image exposure device comprising:

a radiation-sensitive means;

a laser for emitting a laser beam for exposing said radiation-sensitive means for forming an image thereon wherein said laser has a threshold current level above which the laser emits said laser beam;

driving means for driving said laser with an electrical driving current based on an image signal corresponding to said image, said image signal defining at least one time period for driving said laser;

and wherein said driving means comprises means for increasing said electrical driving current up to a predetermined current level in a time $t_{inc}$ substantially immediately before the time period for driving said laser, said predetermined current level being up to about said threshold current level, thereby reducing the emission of undesired radiation; means for subsequently immediately further increasing said electrical driving current to a value above said threshold current level for causing said laser to emit said laser beam and means for decreasing said electrical driving current from said value above said threshold current level to substantially zero in a time not larger then twice said time $t_{inc}$.

14. The image exposure device according to claim 13 wherein said electrical driving current is increasing from a value of substantially zero.

15. The image exposure device according to claim 13, wherein said driving means further has:

feedback means for generating a feedback signal based on the radiation intensity of said laser beam;

comparing means for generating said electrical driving current, based on comparing said feedback signal with a driving signal during exposure of said radiation-sensitive means, said driving signal being based on said image signal.

16. The image exposure device according to claim 13, wherein the image formed on said radiation-sensitive means comprises pixels selected from the group consisting of binary pixels, multilevel pixels and continuous tone pixels.

17. An electrophotographic printer comprising the image exposure device according to claim 13, wherein said radiation-sensitive means is a photoconductive member.

18. An imagesetter comprising the image exposure device according to claim 13, wherein said radiation-sensitive means is a radiation-sensitive sheet.

* * * * *